UNITED STATES PATENT OFFICE.

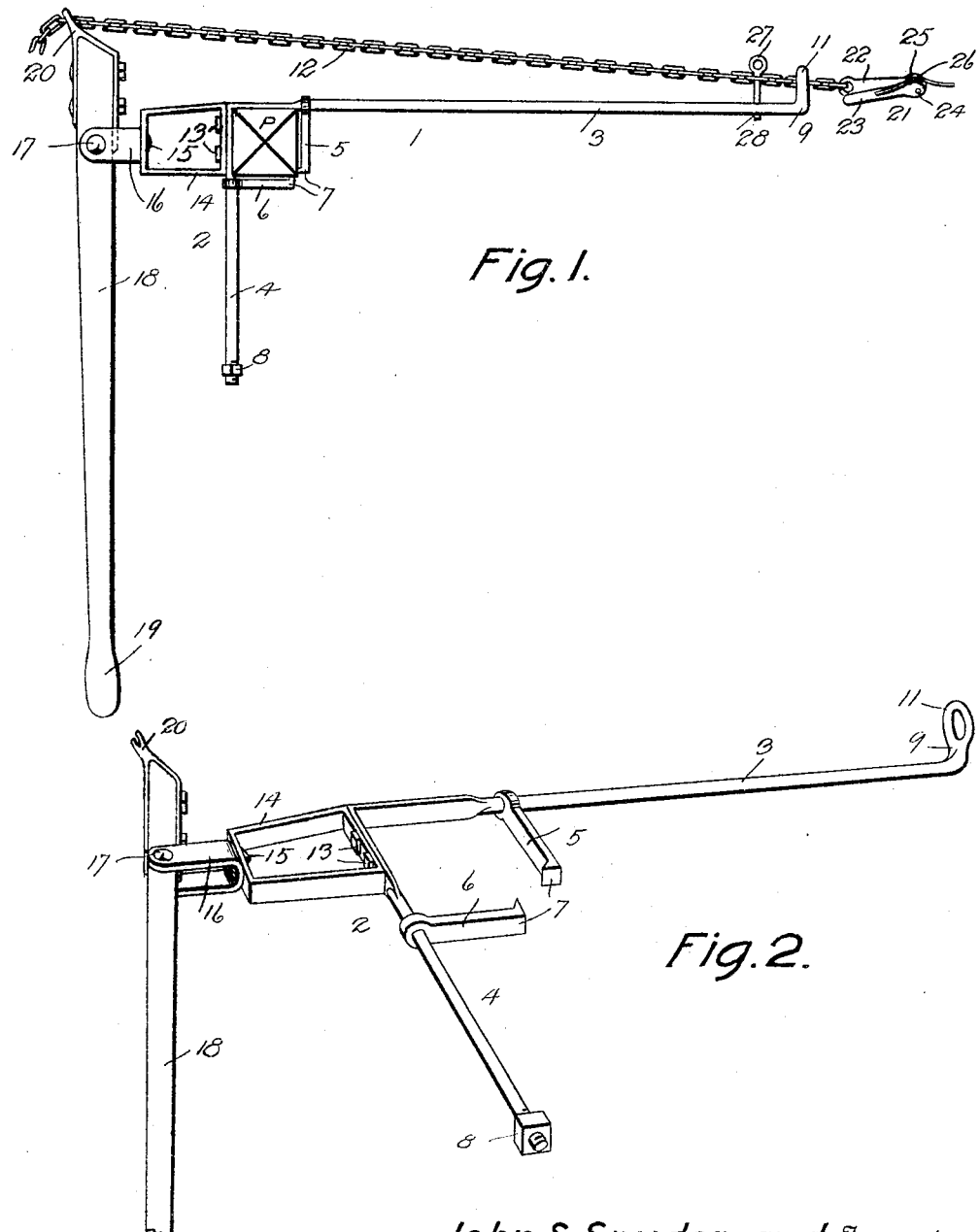

JOHN S. SNYDER AND ROSS A. SNYDER, OF NEW LEXINGTON, PENNSYLVANIA.

WIRE-STRETCHER.

No. 813,837.        Specification of Letters Patent.        Patented Feb. 27, 1906.

Application filed August 7, 1905. Serial No. 273,157.

*To all whom it may concern:*

Be it known that we, JOHN S. SNYDER and ROSS A. SNYDER, citizens of the United States, residing at New Lexington, in the county of Somerset and State of Pennsylvania, have invented certain new and useful Improvements in Wire-Stretchers; and we do declare the following to be a full, clear, and exact description of the invention, such as will enable others skilled in the art to which it appertains to make and use the same.

Our invention relates to improvements in wire-stretchers; and it consists in the novel construction, combination, and arrangement of devices hereinafter described and claimed.

The object of the invention is to improve and simplify the construction and operation of devices of this character, and thereby render the same more efficient and durable in use and less expensive to manufacture.

The above and other objects, which will appear as the nature of our invention is better understood, are accomplished by means of the construction illustrated in the accompanying drawings, in which—

Figure 1 is a plan view of the device, showing the same in use; and Fig. 2 is a perspective view of the frame of the stretcher.

Referring to the drawings by numeral, 1 denotes our improved wire-stretcher, which comprises a substantially right-angular frame 2, consisting of a long member 3 and a short member 4. These members are preferably formed from a single piece of metal rod by bending the same, as shown, and then providing guides for sliding dogs 5 and 6, which coact with the angular portion of the frame to secure the device upon a fence-post or the like P. Each of the members 3 4 has a flattened portion adjacent the angle, so as to firmly engage a rectangular post, and the remaining portions of said members are preferably round or circular in cross-section to permit the dogs 5 6 to readily slide thereon. The said dogs have prongs or spurs 7 at their inner ends to enter the fence-post P and secure the frame thereon, as shown in Fig. 1 of the drawings. The dog 6 is prevented from slipping off of the member 4 by a nut 8, screwed upon its end, and the dog 5 is prevented from slipping off of the member 3 by an arm 9, which is bent at right angles to the member 3 and is provided with a projecting apertured portion 11, which forms a guide for the wire-stretching chain 12. To the inner end of the short member 4 is riveted or otherwise secured, as shown at 13, a bracket 14, which has swiveled upon its outer end, as shown at 15, a yoke 16, between which is pivoted upon a bolt or the like 17 a hand-lever 18. This lever has one of its ends tapered and rounded to form a handle 19, and to its other or heavier end is bolted or otherwise secured a metallic hook or fork 20, which is adapted to be engaged with the links of the chain 12 adjacent to one of its ends. Upon the opposite end of the chain 12 is provided a clamp 21, which, as shown, comprises a plate 22, having a cam-lever 23 pivoted thereon, as at 24. The plate 22 has an aperture at one end, with which the chain is engaged, and at its opposite end is a curved projection 25, which coacts with the serrated face 26 of the cam upon the lever 23, as will be readily understood.

It will be seen that when the handle 19 of the lever 18 is swung inwardly, its hook 20 will be swung outwardly to draw upon the chain 12 and stretch the wire or wires with which the clamp 21 is engaged, and in order to hold the parts in this stretched position we provide a locking pin or key 27, which is adapted to be passed through one of the links of the chain 12 and into an opening 28, formed in the member 3 adjacent to its outer end.

The construction, use, and advantages of the invention will be readily understood from the foregoing description, taken in connection with the accompanying drawings. It will be seen that by making the dogs 5 and 6 slidably adjustable upon the members 3 4 the device may be applied to fence-posts or other objects of any size. When mounted, as shown in Fig. 1, it will be seen that fence or other wires may be readily stretched to any desired tension by engaging the hook 20 with one of the links of the chain 12, then swinging the handle end of the lever inwardly, then locking the chain to the device by means of the pin 27, then swinging the lever to take a fresh grip upon the chain, and then repeating the operation.

Various changes in the form, proportion, and the minor details of construction may be resorted to without departing from the principle or sacrificing any of the advantages of this invention.

Having thus described our invention, what we claim as new, and desire to secure by Letters Patent, is—

1. A wire-stretcher comprising an angular frame, dogs slidable upon the angularly-disposed members of said frame and adapted to engage a post or the like, a guide upon one of said members, a lever pivotally mounted upon the other of said members, a flexible connection passed through said guide and engaged with said lever, a wire-attaching device upon one end of said flexible connection, and means for holding said chain in an adjusted position, substantially as described.

2. A wire-stretcher comprising a frame having substantially right-angularly-extending members, dogs slidable upon said members and formed with prongs to engage a post or the like, stops upon the outer ends of said members, one of said stops being formed with a guide-aperture, a bracket upon one of said members, a lever pivoted to said bracket and having a hooked end, a chain or the like engaged with the hook of said lever and passing through the guide-aperture in said stop, a clamping device upon one end of said chain and a locking-pin adapted to be passed through one of the links of said chain and into an aperture in one of said members, substantially as described.

In testimony whereof we have hereunto set our hand in presence of two subscribing witnesses.

JOHN S. SNYDER.
ROSS A. SNYDER.

Witnesses:
J. FRANK NICKELS,
CYRUS B. MOORE.